Jan. 12, 1937.　　　　W. C. MARSH　　　　2,067,702
STENCIL CUTTING MACHINE
Filed Nov. 23, 1934　　　　6 Sheets-Sheet 1
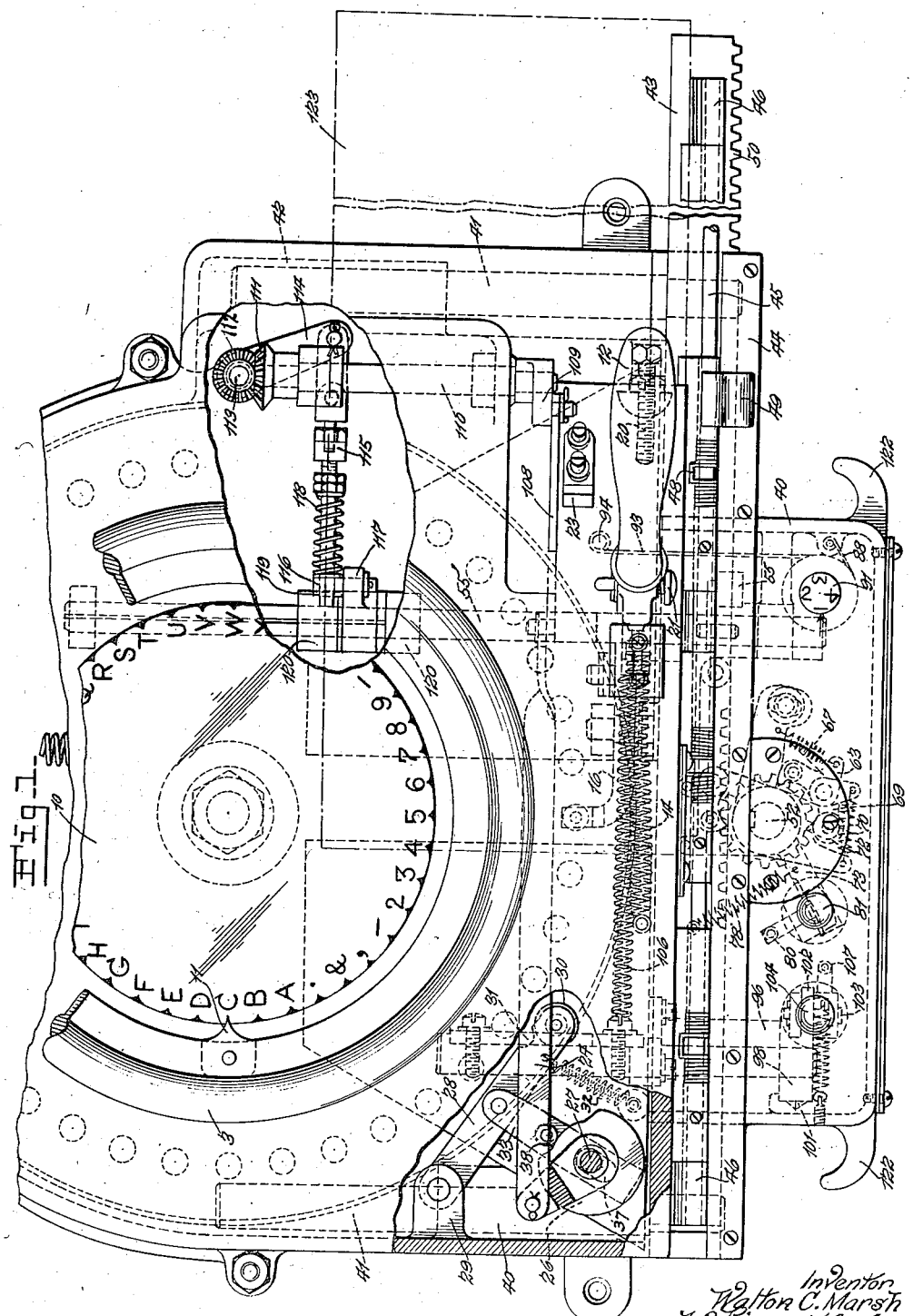
Inventor
Walton C. Marsh
by Rippey & Kingsland
His Attorneys.

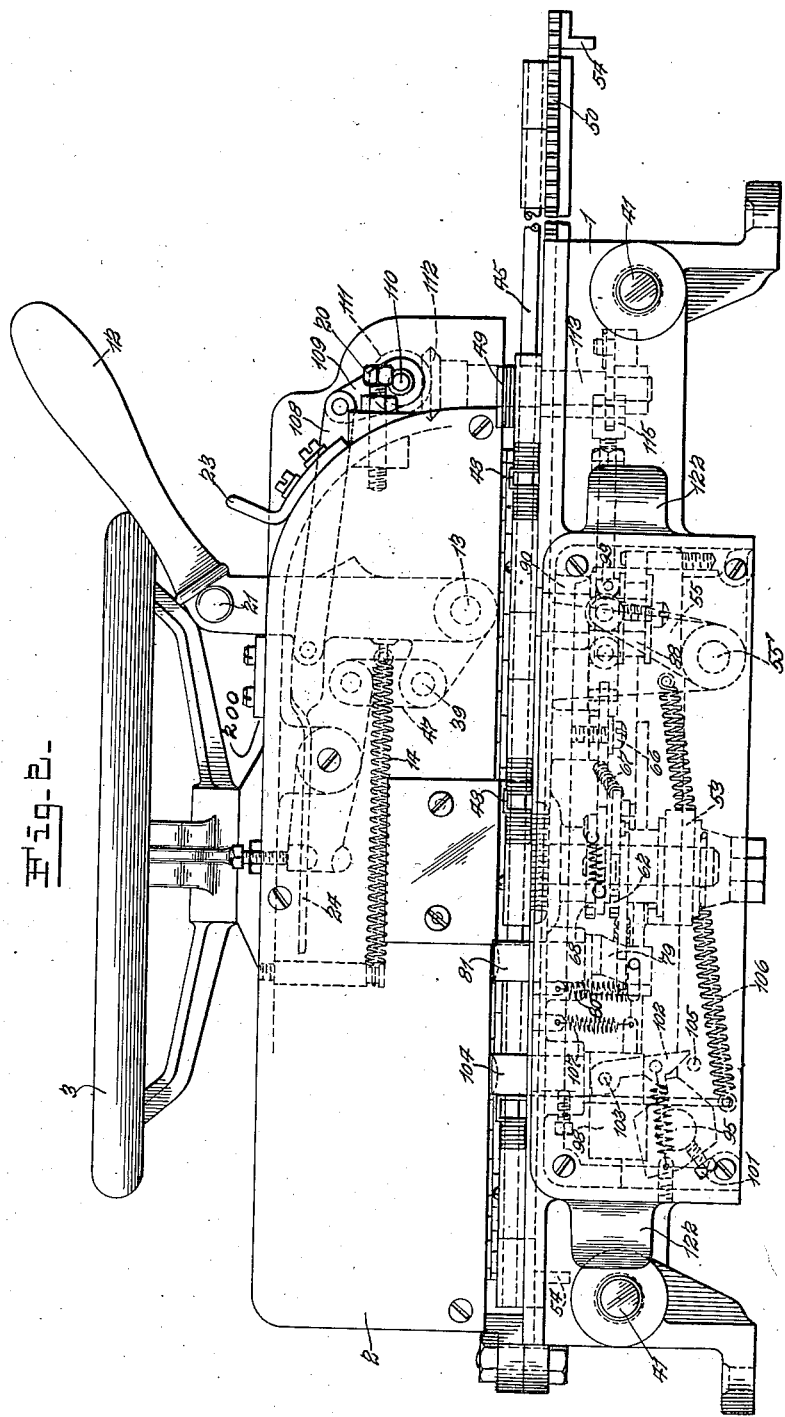

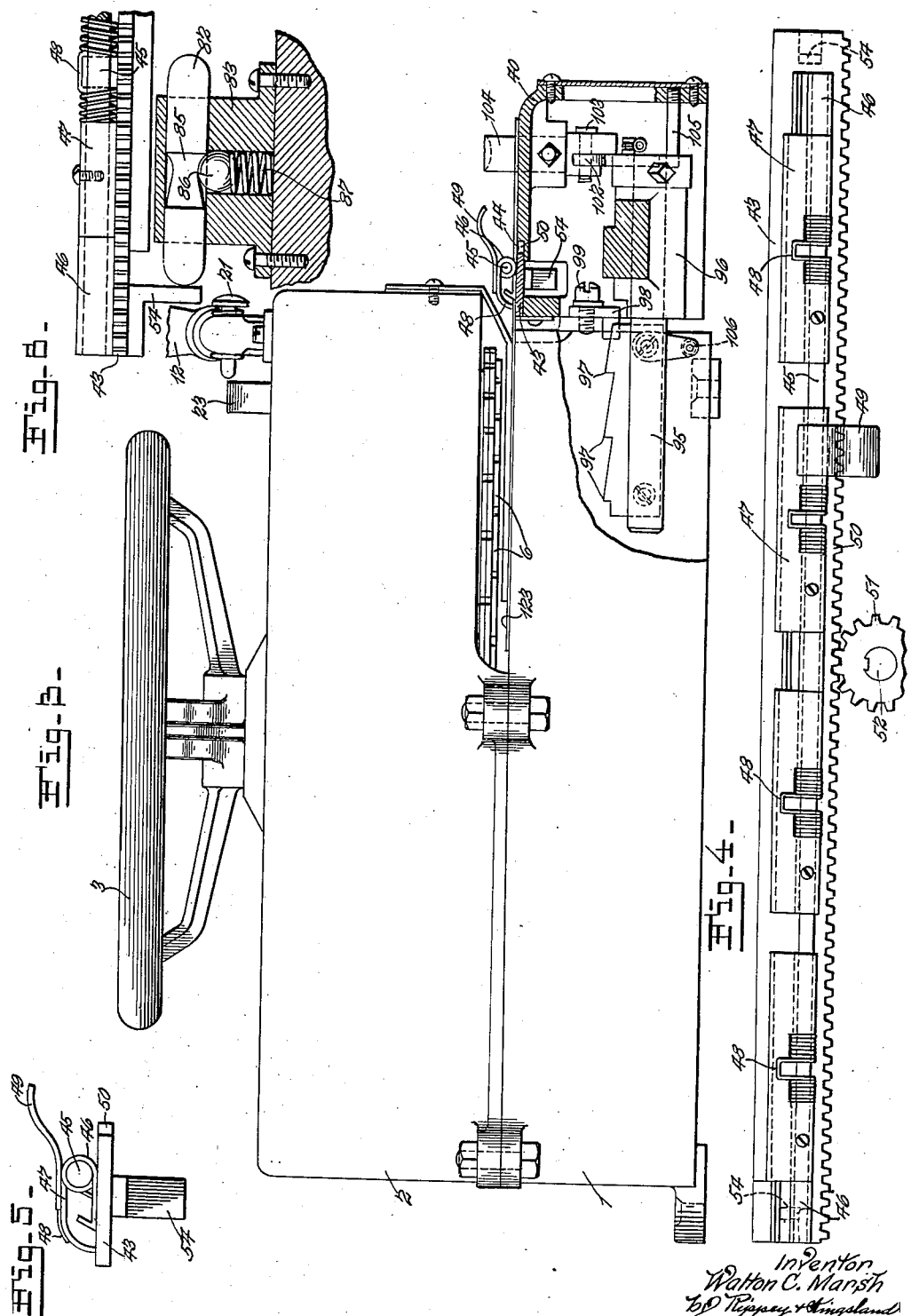

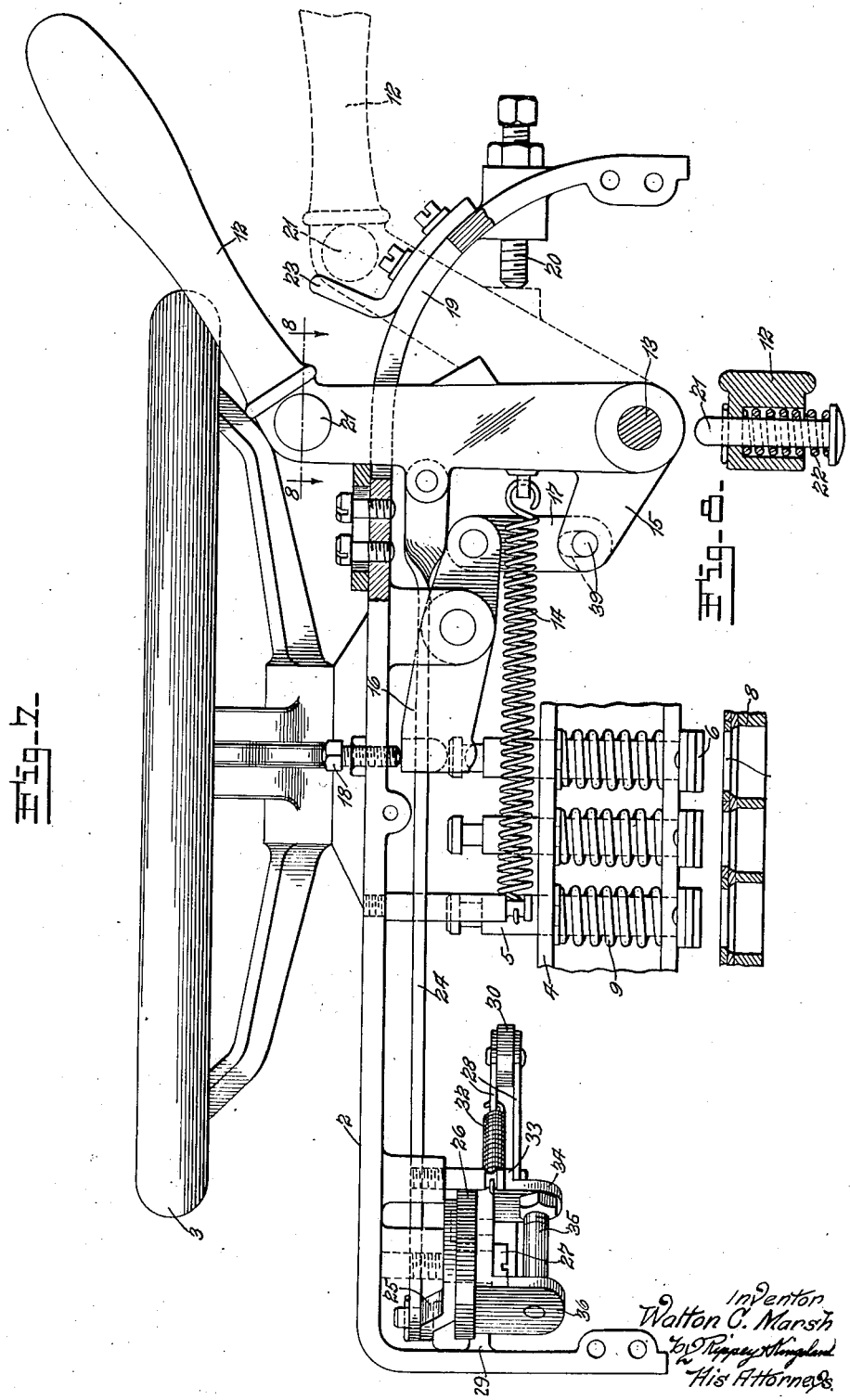

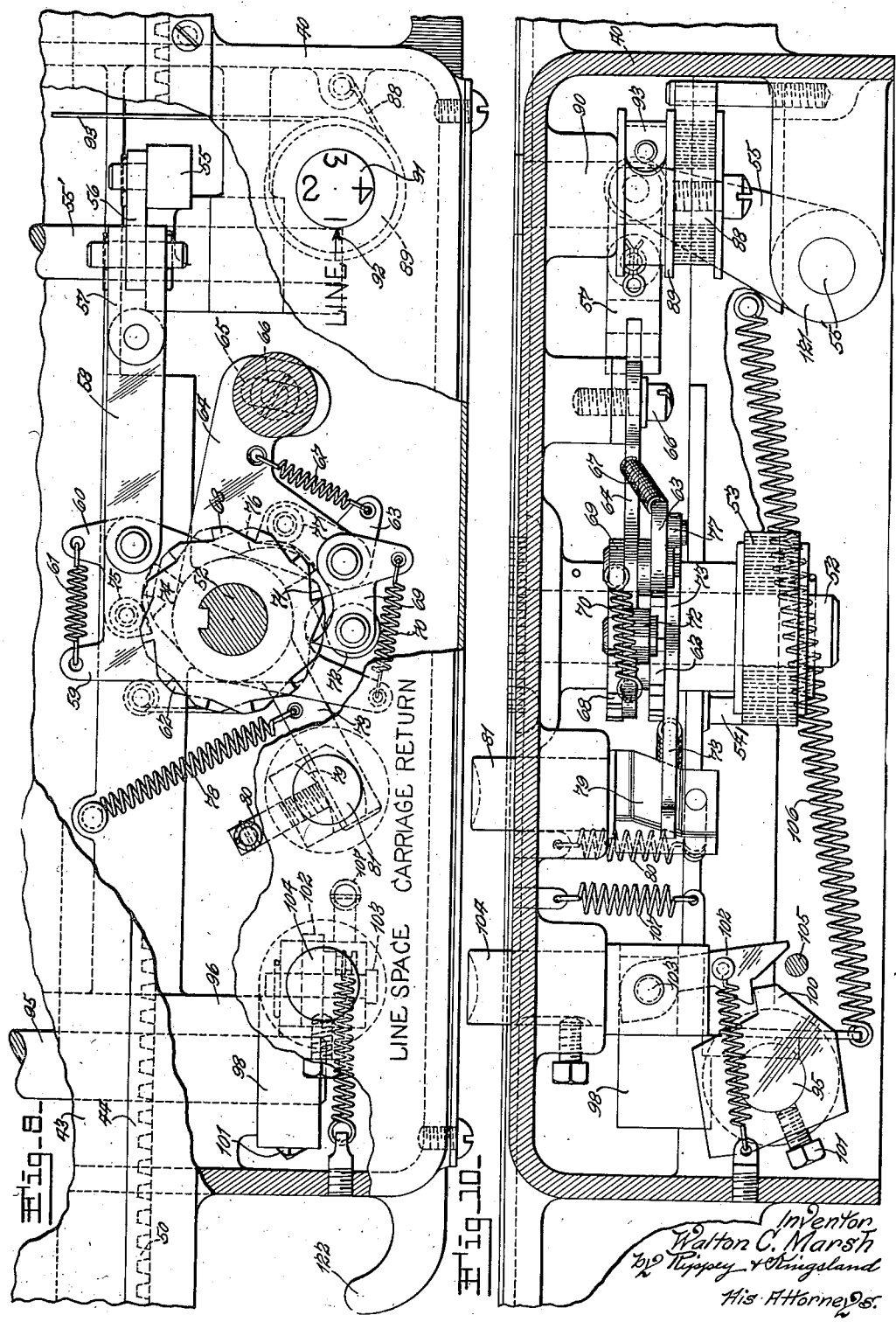

Jan. 12, 1937.    W. C. MARSH    2,067,702
STENCIL CUTTING MACHINE
Filed Nov. 23, 1934    6 Sheets-Sheet 6
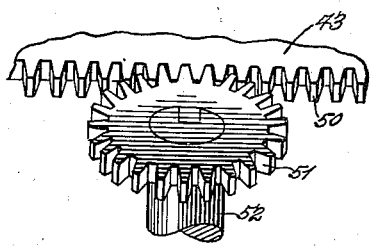
Fig. 11.
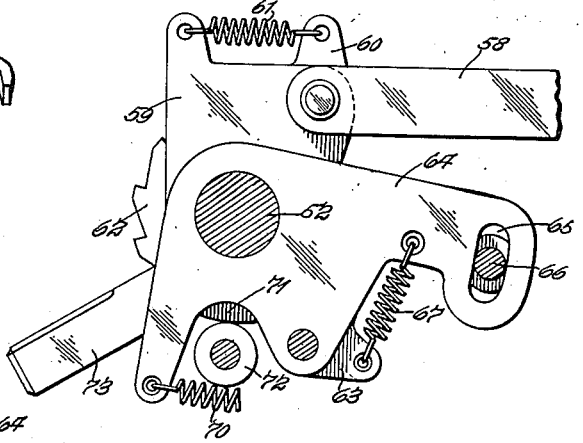
Fig. 12.
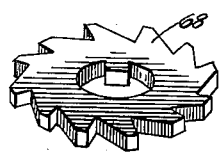
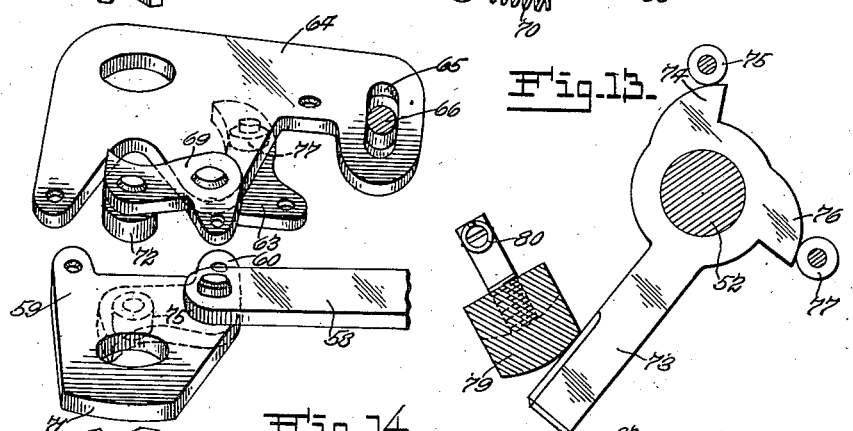
Fig. 13.
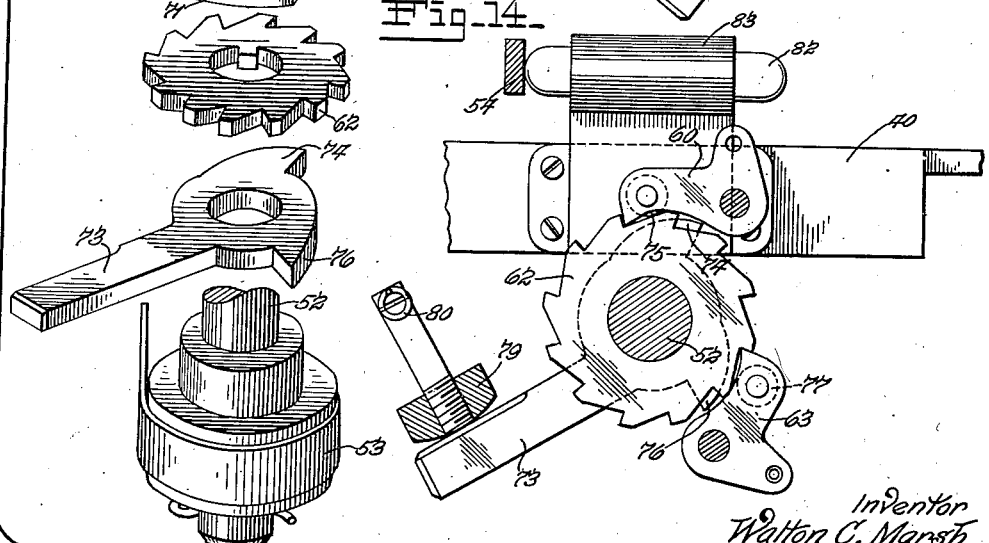
Fig. 14.
Inventor
Walton C. Marsh
by Rippey & Kingsland
His Attorneys Patented Jan. 12, 1937

2,067,702

UNITED STATES PATENT OFFICE 2,067,702

STENCIL CUTTING MACHINE

Walton C. Marsh, Belleville, Ill., assignor to Marsh Stencil Machine Company, Belleville, Ill., a corporation of Illinois Application November 23, 1934, Serial No. 754,418

15 Claims. (Cl. 164—111)

This invention relates to stencil cutting machines, and it comprises the novel and improved features of construction, and elements operating in the advantageous cooperative relationship, to obtain the beneficial results herein disclosed.

The present invention is embodied in a machine of that general type disclosed in Patent No. 1,531,383, granted March 31, 1925, on application of Gustave F. Fuchs and Walton C. Marsh, and an object is to provide various improvements in said machine whereby the operation of the machine is facilitated and the desired stencil cutting operations are performed with greater precision and speed.

A specific object of the invention is to provide improved mechanism, embodied in the machine, for effecting the longitudinal letter spacing movements and other similar longitudinal movements of the stencil sheet, and for varying the extent of such longitudinal movements as required for word spacing and letter spacing and other spacing movements of varying lengths.

Another object of the invention is to provide devices and mechanism for centering and accurately adjusting the punches and the dies relatively before the machine may be operated in a stencil cutting operation, and to utilize said devices and mechanism when out of accurate adjustment or out of center to prevent effective cutting operations of the stencil cutting mechanism.

Another object of the invention is to provide improved means for moving the stencil sheet laterally in line spacing so as to present a different part of the stencil sheet for stencil cutting operations to form a different line in the composite stencil.

Another object of the invention is to provide improved means for controlling operation of the carriage and for returning the carriage to its starting position at the completion of each line of stencil cutting.

Various other objects and advantages of the invention and numerous improved features therein will readily be apparent from the following description, reference being made to the annexed drawings, in which—

Fig. 1 is a top plan view of my improved stencil cutting machine with parts broken away.

Fig. 2 is a front elevation of the machine.

Fig. 3 is a side elevation with parts of the line spacing mechanism shown in section.

Fig. 4 is a plan view of the stencil sheet clamping devices that hold the stencil sheet flat upon the carriage.

Fig. 5 is an end elevation of the clamping devices.

Fig. 6 is a slightly enlarged detail view of a portion of the mechanism that stops the stencil sheet carriage in its starting or unoperated position.

Fig. 7 is a detail view with parts in section showing the operating mechanism for the dies.

Fig. 8 is a sectional view on the line 8—8 of Fig. 7, showing the device for limiting extent of movement of the stencil sheet carriage to vary the space between adjacent stencil cuttings.

Fig. 9 is a view, with parts in section, showing the mechanism controlling longitudinal spacing movements of the stencil sheet carriage and also showing a part of the line spacing mechanism.

Fig. 10 is a vertical sectional view of the frame of the machine showing the letter spacing and line spacing mechanisms in side elevation.

Fig. 11 is an extended perspective view of the elements comprising the stencil sheet carriage feeding mechanism.

Fig. 12 is a plan view of certain of said elements in superimposed relationship, a few of the parts being in section.

Fig. 13 is a view showing the device for releasing the stencil sheet carriage to permit the same to be returned to its starting position.

Fig. 14 is a view showing a part of the carriage letter spacing mechanism and the device for stopping the carriage in its starting position.

The operative mechanism of the machine is supported by a frame comprising a base 1 and a hood 2, said hood being in the form of a hollow inverted casing. As in said Patent No. 1,531,383, a hand wheel 3 is appropriately attached to a rotary cutting punch carriage 4, so that said hand wheel will rotate said punch carriage. The stems 5 that support the stencil cutting punches 6 are mounted for vertical sliding movements in the carriage 4 toward and from the openings 7 in the dies 8, the latter being mounted on the base member 1. The stencil sheet is supported between the punches 6 and the dies 8, so that when the punches 6 are driven downwardly, the stencil sheet will be cut thereby. Springs 9 encircle the respective stems 5 and operate to raise said stems in a familiar manner and as disclosed in said patent.

The hand wheel 3 is rotative with respect to a fixed and stationary dial plate 10 having the letters of the alphabet, the digits, and characters for punctuation thereon (Fig. 1). A pointer 11 attached to the hand wheel 3 guides the operator in placing the proper dies or punches in position for operation as in the machine of said patent.

An operating handle 12 is attached to a rock shaft 13 and is yieldingly urged to its starting or inoperative position by a spring 14, attached at one end to the handle and at the other end to a stanchion depending from and secured to the hood 2. A punch actuating lever 16, pivoted to the hood 2, is connected with a bell crank arm 15 on the handle 12, by means of a link 17, the connection of the lever 17 with arm 15 being through a lost motion pivot 39, to be explained hereinafter. It will be seen that the actuating lever 16 at one end overlies one of the stems 5, so as to depress the same upon its actuation by the handle 12. The movement of the lever 16 in the release direction is limited by an adjustable set screw 18.

The lever 12 extends through a slot 19 in the hood 2 and the extent of movement of said lever from its retracted position is limited by an adjustable abutment 20 supported by the hood 2. The adjustable abutment 20 functions to limit extent of movement of the lever 12 at each full stroke movement of said lever. A headed pin 21 is supported by the lever 12 and yieldingly held in retracted position by the action of a spring 22 against the head thereof as shown in Fig. 8. The spring 22 will yield to pressure applied to the headed end of the pin 21 and permit said pin 21 to be projected to a position in which it will engage against an abutment 23 attached to the hood 2 to thereby stop further movement of the lever 12 and prevent a full stroke movement thereof. Movement of the lever 12 in the other direction is limited by an adjustable stop 200, operating in the obvious manner.

A link 24 has one end pivoted to the lever 12 at a point spaced from the shaft 13, and the opposite end pivoted to an arm 25 attached radially to a cam 26 supported by a pivot 27, the pivot being threaded into a suitable projection on the hood 2. When the lever 12 is operated, the cam 26 will be rocked about the axis of said pivot 27 (Figs. 1 and 7).

A centering arm 28 has one end mounted on a pivot 29, the pivot being on the hood 2, and the opposite end supporting a centering roller 30. The centering arm 28 may comprise two parts concentrically pivoted at one end on the pivot 29 and supporting the roller between their opposite ends (Fig. 7). A centering concave notch 31 is formed in the side of the arm 28 that is toward the stems 5. When the arm is swung toward the stems 5, the centering roller 30 will extend between two adjacent stems 5, the notch 31 permitting sufficient movement of said arm for the roller to engage said two stems. This engagement by the roller 30 will impart any required slight turning movement to the die carriage 4 and thereby will give a final adjustment of the punch carriage into position in which the operating punch is exactly in alignment with the die 8. It will be understood that in setting the punch carriage by the hand wheel 3, the former may not be perfectly aligned, and this roller 30 insures exact alignment before the punch is depressed. As the centering mechanism is intercontrolled with the punch actuating mechanism, this precise alignment is effected for each individual operation.

An L-shaped link 33 has one end pivoted to the arm 28 (Fig. 1) preferably extending between the two blades thereof and the opposite end at 34 extending downwardly (Fig. 7). The downwardly extending portion 34 has an adjustable connection 35 with an angular L-shaped frame member 36 that is provided with an elongated slot 37 (Fig. 1) through which the pivot 27 extends. The frame 36 is rotatably and slidably mounted on the pivot 27. A cam follower here shown as a roller 38, is mounted on the arm 36. A spring 32 secured to the arm 28 and to the hood 2 at its respective ends, draws the follower 38 into contact with the cam 26, it being obvious that this is accomplished by means of the connection between the arm 28 and the link 33. The latter link will reciprocate under action of the cam, when the same is oscillated, and this reciprocation will oscillate the arm 28 to shift the roller 30 into or out of position against the punch stems 5 in accordance with the position of the operating handle 12. In order to adjust the arm 28 and roller 30, the connector 35 is rotated, the lock nut shown having been released. This rotation adjusts the arm 33 relatively to the arm 36. As the latter carries the cam follower 38, the arm 33, and arm 28 are moved inwardly or outwardly relatively to the cam follower 38.

In addition to the precision centering obtained by this mechanism, a locking of the die carriage against accidental displacement before the punch is operated, is effected. The lost motion at 39, between arm 15 and link 17 permits the arm 24 to actuate the centering mechanism prior to depression of the punch by the lever 16.

A frame 40 adapted to carry the stencil sheet by mechanism to be described is mounted at the front of the machine and is movable toward and from the base 1 in line spacing movements. This frame may be guided by any appropriate means as by rods 41 operating in guides 42 rigid with the base of the machine. A plate 43 is mounted for transverse sliding movements in a guide 44 (Figs. 1 and 3) on the upper side of the frame 40. A rod 45 is mounted in bearings 46 on the plate 43 and has a series of clamping plates 47 mounted thereon to oscillate therewith and actuated toward the plate 43 by springs 48 mounted on the rod 45 and pressing the free edges of the plates 47 toward the plate 43 to clamp said plates 47 upon the stencil sheet extending between the plate 43 and the edges of the plates 47. A lever 49 attached to one of the plates 47 constitutes means for turning the rod 45 in opposition to the springs 48 to raise the edges of the plates 47 from the plate 43 to permit a stencil sheet to be passed between the plate 43 and the edges of the plates 47 preparatory for operation of the machine to cut said stencil sheet. Similarly the rod 45 may be turned to release the plates 47 from engagement with the stencil sheet to permit the sheet to be withdrawn.

The forward edge of the plate 43 comprises a rack 50 in permanent mesh with a gear wheel 51 attached to the upper end of a vertical shaft 52 (Figs. 1, 4 and 10). The shaft 52 is supported in the frame 40 and is rotated by mechanism to be described to reciprocate the plate 43 and thereby carry the stencil sheet across the machine for progressive lettering. Also, the shaft 52 is actuated in a direction to move the plate 43 transversely of the machine to its starting position after completion of each line of stencil lettering by a spring 53 having one end attached to said shaft 52 and the opposite end attached to a stationary member 541.

An arm 55 (Figs. 9 and 10) is attached to a shaft 55' and has one end of a link 56 pivoted thereto, the opposite end of said link 56 being pivoted to one end of a transposing link 57 that is connected with the link 56 by a horizontal pivot, the opposite end of said link 57 being pivoted by a vertical pivot to the adjacent end of a third link 58 having its opposite end pivoted to a plate 59, that is rotatably mounted on the shaft 52.

An actuating pawl 60 pivoted to the plate 59 is actuated by a spring 61 (Figs. 10 and 12) into engagement with a ratchet wheel 62 attached to the shaft 52 and operates to turn the shaft 52 a distance equal to two teeth on the gear wheel 51 at each full stroke of the handle 12. The connection between the handle 12 and this mechanism is to be described subsequently.

Another detent pawl 63 is supported by an arm 64. This arm 64 is pivoted on the shaft 52 and has a slot 65 receiving a stationary member 66 which limits extent of turning movement of the arm 64 with or about the shaft 52. A spring 67 presses the detent pawl 63 into engagement with the ratchet wheel 62.

Another ratchet wheel 68 is attached to the shaft 52, the teeth being arranged oppositely from the teeth on the ratchet wheel 62 and being engaged by a retaining pawl 69 supported by the arm 64 and actuated by a spring 70. Therefore, it is necessary to disengage the pawl 69 from the ratchet wheel 68 in order to permit the actuating pawl 60 and ratchet wheel 62 to turn the shaft 52. For this purpose the plate 59 is formed with a cam 71 which operates against a roller 72 supported by the pawl 69 to disengage said pawl 69 from the ratchet wheel 68 at the proper time to permit the pawl 60 to turn the ratchet wheel 62 and thereby the shaft 52 in letter spacing movements. In the unoperated position of the plate 59, the cam 71 permits the retaining pawl 69 to engage the ratchet wheel 68 but, during almost the entire movement of the arm 59 from and to its unoperated position, the cam 71 by operating against the roller 72 holds the pawl 69 out of engagement with the ratchet wheel 68, so that said pawl 69 does not interfere with the turning of the shaft 52. When the plate 59 approaches its unoperated position, the cam 71 passes out of engagement with the roller 72, leaving the retaining pawl 69 free to engage the ratchet wheel 68, and to prevent advance of the carriage beyond the spacing by the actuating pawl 60. The movement of the arm 64 that carries the pawls 63 and 69 coordinates the engagement and disengagement of the pawl 69 with the ratchet wheel 68.

After each line of stencil cutting has been completed, the pawls 60 and 63 are disengaged from the ratchet wheel 62 and the spring 53 rotates the shaft 52 in a direction to return the carriage 43, etc. to position for another line of stencil cutting. Such release is effected by operation of a member 73 pivoted on the shaft 52 and having a cam 74 for engaging a roller 75 on the pawl 60 and having a cam 76 for engaging a roller 77 on the pawl 63. The member 73 is held in its unoperated position by a spring 78 and is operated in opposition to said spring by a cam 79 (Fig. 10) supported by a spring 80 and being depressible by a push button device 81 projecting upwardly through an opening in the upper wall of the frame 40. When the push button device 81 is pushed downwardly, the cam 79 is moved downwardly thereby and operates the member 73 to move the cams 74 and 76 against the rollers 75 and 77, respectively, to disengage the pawls 60 and 63 from the ratchet wheel 62 simultaneously. When said pawls 60 and 63 are both out of engagement with the ratchet wheel 62, the spring 53 rotates the shaft 52 in a direction to cause the gear 51 to move the carriage 43, etc. to its starting position. When the push button 81 is released, the spring 80 returns said push button and the cam 79 to their unoperated positions and the spring 78 returns the member 73, and thereby the cams 74 and 76, to positions in which said cams 74 and 76 are out of engagement with the rollers 75 and 77 thereby permitting the springs 61 and 67 to reengage the pawls 60 and 63 with the ratchet wheel 62.

A yielding stop is provided to stop the carriage 43 in its starting position when said carriage is returned to said position by operation of the spring 53, as described. Said stop comprises a slide 82 (Fig. 6) mounted in a support 83 in position to be engaged by the arm 54 attached to the carriage 43, etc. Said slide 82 is formed with a recess 85 in which a spherical detent 86 is engaged by a spring 87, said spring permitting a limited movement of the detent and thereby permitting a limited movement of the slide 82 (Fig. 6).

A spring 88 is connected with and rotates in one direction a spool 89 attached to a rotary axle 90 that extends upwardly through the upper wall of the frame 40 and has a dial 91 on its upper end. The designations on the upper end of the dial 91 (Fig. 9) cooperate with a pointer 92 formed on the upper wall of the frame 40 to indicate the different line space positions of the frame 40. For instance, in the specific embodiments shown, the frame 40 is movable to four different line space positions, such movement being toward and from the machine proper. A tape 93 has one end attached to the spool 89 and the opposite end attached to a stationary part 94 (Fig. 1) and functions, during outward movement of the frame 40, to rotate the spool 89 in the opposite direction from the direction of rotation by the spring during inward movement of said frame 40.

A shaft 95 (Figs. 3 and 10) is supported for rocking movements in a bearing 96 supported by the frame 40. A series of line space stops 97 are mounted on the shaft 95 and by engagement with a detent 98 will stop movement of the frame 40 toward the machine proper in the different line space positions. The detent 98 is mounted on a support 99 and is not engaged by the stops 97 during outward movement of the frame 40, because said stops are held turned laterally as hereinafter explained, but will be engaged by said stops 97 to stop the frame 40 in its different line space positions.

A shoulder 100 is attached to the shaft 95 and may be secured in different adjusted positions by a set screw 101. A detent 102 is mounted on a pivot 103 supported by a push button 104 mounted for vertical sliding movements in the frame 40 and extending above said frame. When the push button 104 is pushed downwardly, the detent 102 engages the shoulder 100 and turns the shaft 95 to disengage the shoulders 97 from the detent 98, whereupon the frame 40 will be moved one step toward the machine proper by any suitable means. During downward movement of the push button 104, the detent 102 engages an abutment 105 (Fig. 10) and is thereby disengaged from the shoulder 100, whereupon the shaft 95 is quickly returned to its unoperated position by a spring 106 in time for the next line space stop 97 to engage the detent 98 and stop the frame 40 in the proper line space position, as indicated by the dial 91. The push button is raised and yieldingly supported by a spring 107.

The shaft 55' is rocked by mechanism operated by the shaft 13. A link 108 (Figs. 1 and 2) has one end pivotally connected with the operating handle 12 and the opposite end pivoted to an arm 109 attached to a rock shaft 110. A pinion 111 attached to the rock shaft 110 meshes with a pinion 112 attached to the upper end of a vertical shaft 113. An arm 114 is attached to the lower end of the shaft 113 and has one end of a link device 115 pivoted thereto. The opposite end of the link device 115 extends through a part 116 rotatively supported by a crank arm 117 extending upwardly from the shaft 55'. A spring 118 mounted on the link device 115 bears against the part 116 and is effective to turn the shaft 55' in a counter-clockwise direction, as seen in Fig. 10, when the operating handle 12 is moved from its unoperated position toward the abutment 20, and a member 119 attached to the link device 115 at the opposite side of the part 116 is effective to turn the shaft 55' in the opposite direction when the operating handle 12 is moved to its starting or unoperated position.

The shaft 55' is supported for sliding and turning movements by bearings 120 and the arm 117 is mounted between said bearings 120 and held by said bearings from being moved along with the shaft 55' when said shaft is moved longitudinally. The forward or outer end of the shaft 55' is supported in a bearing 121 (Fig. 10) rigid in the frame 40. The arm 117 is incapable of turning relative to the shaft 55' but is capable of longitudinal movement along said shaft when the shaft is moved longitudinally by inward and outward movement of the frame 40.

Handles 122 (Fig. 1) are provided in connection with the frame 40 for manual engagement to move said frame 40 outwardly from the machine proper.

In operation, a stencil sheet 123 is engaged in the carriage 43, etc. and said carriage is moved to position for operation of the stencil cutting dies and supports the stencil sheet in position in which said stencil sheet extends between the cutting dies 6 and the members 8. The hand wheel 3 is operated successively to adjust the proper cutting dies in position for operation. The handle 12 is operated after each cutting die has been placed in position for operation. The connections, comprising the link 24 operated by the handle, move the centering arm 28 to position to center the cutting die carriage in proper position and to lock the same against accidental movement. The connections operated by the handle lever also operate the letter spacing mechanism in the manner heretofore described to move the carriage 43, etc. longitudinally in letter spacing movements.

The connections, comprising the link 108, the shaft 110 and other parts operated thereby, impart rocking movements to the shaft 55' and thereby operate the letter spacing mechanism a full letter space, excepting when the pin 21 is pushed inwardly to prevent a full stroke of the handle 12, in which case the carriage is moved only one-half of a full letter space.

The frame 40 is moved in line spacing by any suitable actuating means when the line space button 104 is depressed. After each line has been cut, the carriage 43, etc. is moved to its starting or unoperated position by the spring 53, which is permitted to function when the part 81 is depressed to cause the cams 74 and 76 to disengage the pawls 60 and 63 from the wheel 62 and the carriage is stopped in its starting position when the projection 54 engages the yielding stop 82.

These improved mechanisms may be varied within the scope of equivalent limits without departure from the nature and principle of the invention.

I claim:

1. In a device of the kind described, a base, a handle movably mounted thereon, a series of movable stencil cutter mechanisms any one of which is adapted to be brought to an initial position, wherein to be operated, a centering mechanism having means adapted to be selectively engaged with certain of said cutter mechanisms to properly align the one to be operated, a link connecting said centering mechanism to said handle, a member movable to actuate the aforementioned cutter mechanism, link means connecting said member to said handle, said connection including a pin and slot permitting lost motion whereby the handle may move a predetermined distance without actuating the said member.

2. In a device of the kind described, a base, a centering device including a lever fixedly pivoted to the base and adapted to be moved into actuating position, means for moving said lever, and means for adjusting the limit of the moving means whereby to define the extent of movement of the lever into actuating position.

3. In a device of the kind described, a base, a centering mechanism movably mounted thereon, said mechanism including a movable centering device, a cam, means including an arm connected with said device and operated by said cam for moving the device in response to movement of the cam, and means for adjusting the length of said arm to vary the distance between the cam and the point of connection of the device and said means.

4. In a device of the kind described, a base, a punch supporting member movably mounted on the base, a series of punches on the supporting member, an actuating element, a centering mechanism, including a lever having an end adapted to engage between adjacent punches to center the supporting member, a cam pivoted on the base, means connecting the cam with the actuating member to be moved thereby, a cam follower, a support for said cam follower, said support being slidably mounted on the cam pivot, and a connector means adjustably joining the cam follower support and the centering lever.

5. In a device of the kind described, a base, a carriage movably mounted toward and away therefrom, means including a plurality of sequential stops for limiting its movement in one direction to a series of steps, and means for releasing its movement from one stop to permit it to move to the next stop, but preventing its movement beyond said next stop.

6. In a device of the kind described, a base, a carriage movable toward and from the base, means interengaging the carriage and the base including a series of stops and a detent engageable with a selected one of the stops, means for directing the stops and the detent out of engagement with each other whereby the carriage may be removed toward engagement by a subsequent stop, and means for releasing the disengagement means prior to the point whereby the subsequent stop and detent may engage, so that the movement of the carriage is limited to the space between adjacent stops.

7. In a device of the kind described, a base, a carriage movable toward and from the base, a rock shaft on the carriage, a series of stops on the rock shaft, a detent engageable with a selected one of the stops for limiting the movement of the carriage, means for rocking the rock shaft to disengage the stop from the detent, and means for disengaging the rocking means promptly after its disengagement, whereby the rock shaft may return to engage a subsequent stop with the detent.

8. In a device of the kind described, a base, a carriage movable toward and from the base, a rock shaft on the carriage and having a series of stops thereon, a detent on the base engageable with a selected one of the stops, a reciprocable element engageable with the rock shaft for rocking the same to disengage the stop from the detent, and means for disengaging the reciprocable element from the rock shaft at the end of the former's reciprocation, whereby the rock shaft may be returned to engage a subsequent stop with the detent.

9. In a device of the kind described, a base, a carriage movable toward and from the base, a rock shaft on the carriage and having a series of stops thereon, a detent on the base engageable with a selected one of the stops, means for rocking the shaft to disengage the stop, and means whereby the rocking means may be adjusted relative to the shaft, and secured in adjusted position.

10. In a device of the kind described, a rock shaft, a push button, engaging means on the rock shaft, a device movably mounted on the push button engageable with the engaging means to rock the shaft upon actuation of the button, a cam on said movable device, and a cam actuator adapted to engage said cam to free the movable device from the engaging means of the rock shaft after the shaft has been rocked free of the detent, and to permit the shaft to return for engagement of a subsequent stop with the detent.

11. In a device of the kind described, a base, a carriage reciprocable thereacross, a stop mechanism for said carriage including a plunger engageable by the carriage, a support through which the plunger extends, a sloping surface on the plunger at the part within the support, and a spring pressed detent engaging said surface whereby to provide a resilient stop for the carriage.

12. In a device of the kind described, a base, a carriage movable toward and from the base in line spacing intervals, a rotary indicator on the carriage and means for rotating it in response to movement of the carriage, said indicator being located substantially flush with the top surface of the carriage and designating the particular line space position in which the carriage is located.

13. In a device of the kind described, a base, an operating lever rotatably mounted thereon, a movable punch device mounted on the base, a punch actuating connection between the operating lever and the punch including a lever pivoted to the base and engageable at one end with the punch to depress the same, means connecting said punch actuating lever with said operating lever including a pin-and-slot connection adapted to move the punch only after predetermined preliminary movement of the operating lever, a centering mechanism, and a link connecting the centering mechanism with the operating lever for operating the centering mechanism during the said preliminary movement of the said lever.

14. In a device of the kind described, a base, a lever movably mounted thereon, a cam, a pivot extending from said base, and upon which said cam is mounted, a cam follower device including a plate having a flange projecting therefrom, a member pivoted to said lever, said member having a portion extending in opposed relationship to said flange, and means adjustably connecting said flange and said extending portion, thereby to adjust the distance between the cam and the lever.

15. In a device of the kind described, a base, a centering mechanism mounted on the base, and including a lever pivoted to the base, a cam rotatably mounted on the base, an adjustable arm connecting said lever with said cam for operation thereby, said arm including a cam follower portion connected to the base and having a cam follower thereon, and a connector member supported on said cam follower portion and adapted to connect the cam follower portion with the lever, said connector member being adjustable on said cam follower portion to vary the overall length of said adjustable arm and thereby to vary the distance from the cam follower to the lever.

WALTON C. MARSH.